(12) United States Patent
Siddle

(10) Patent No.: US 7,137,468 B2
(45) Date of Patent: Nov. 21, 2006

(54) METHODS AND APPARATUS FOR CONVERSION OF MOTORCYCLE REAR SUSPENSION

(76) Inventor: Mark L. Siddle, 5 Greenbriar Summit Ct., St. Peters, MO (US) 63376

(*) Notice: Subject to any disclaimer, the term of this patent is extended or adjusted under 35 U.S.C. 154(b) by 0 days.

(21) Appl. No.: 10/945,835

(22) Filed: Sep. 21, 2004

(65) Prior Publication Data
US 2006/0060407 A1   Mar. 23, 2006

(51) Int. Cl.
*B62K 25/28*   (2006.01)
(52) U.S. Cl. .................. 180/227; 180/219; 280/284
(58) Field of Classification Search ........... 180/219, 180/227; 280/284, 278, 287
See application file for complete search history.

(56) References Cited

U.S. PATENT DOCUMENTS

| | | | |
|---|---|---|---|
| 1,576,216 A * | 3/1926 | Phillips | 280/284 |
| 4,022,484 A * | 5/1977 | Davis | 280/284 |
| 4,061,354 A | 12/1977 | Blum | |
| 4,735,277 A | 4/1988 | Prince | |
| 5,062,495 A | 11/1991 | Padgett | |
| 5,193,834 A * | 3/1993 | Strozyk | 280/278 |
| RE34,897 E | 4/1995 | Richardson et al. | |
| 5,469,930 A | 11/1995 | Wiers | |
| 5,692,577 A | 12/1997 | Dornbusch et al. | |
| 5,785,141 A | 7/1998 | Breitkreutz et al. | |
| 5,996,718 A * | 12/1999 | Desrosiers | 180/227 |
| 6,098,736 A | 8/2000 | Smith | |
| 6,131,684 A * | 10/2000 | Ticknovich | 180/227 |
| 6,142,498 A | 11/2000 | Smith | |
| 6,189,638 B1 | 2/2001 | Ito et al. | |
| 6,279,935 B1 * | 8/2001 | Wagner | 280/287 |
| 6,315,071 B1 | 11/2001 | Gogo | |
| 6,371,236 B1 | 4/2002 | Fukunaga | |
| 6,450,282 B1 | 9/2002 | Gogo et al. | |
| D465,753 S | 11/2002 | Hamann et al. | |
| 6,575,259 B1 * | 6/2003 | Buell et al. | 180/219 |
| 6,640,922 B1 | 11/2003 | Nakagawa | |
| 6,691,814 B1 | 2/2004 | Toyoda | |
| 2001/0027888 A1 * | 10/2001 | Scherbarth | 180/219 |
| 2002/0066611 A1 * | 6/2002 | Lane et al. | 180/228 |

* cited by examiner

*Primary Examiner*—Kevin Hurley
(74) *Attorney, Agent, or Firm*—Armstrong Teasdale LLP; Robert E. Slenker, Esq.

(57) ABSTRACT

A swing arm configured to be attached to a frame of a motorcycle is described. The swing arm includes at least one attachment member, a pair of V-shaped swing arm members each having an open end, a pair of swing arm side plates each attached across the open end of a respective V-shaped swing arm member, and at least two cross members configured to attach the side plates to one another. The swing arm side plates include a swing arm pivot for pivotably attaching the swing arm to the motorcycle frame and a plurality of openings. The openings are configured to align with holes formed in the motorcycle frame to accept insertion of the at least one attachment member. The insertion of attachment members are configured to defeat the pivoting of the swing arm with respect to the motorcycle frame. A method for modifying a suspension system of a motorcycle is also described.

5 Claims, 6 Drawing Sheets

METHODS AND APPARATUS FOR CONVERSION OF MOTORCYCLE REAR SUSPENSION

BACKGROUND OF THE INVENTION

This invention relates generally to motorcycle suspension systems, and more specifically, to methods and apparatus for converting the suspension structure of a motorcycle swing arm.

At least some known older motorcycles did not include rear suspension systems. The rear wheel assembly was attached directly to a frame of the motorcycle. As a result, the riders of such motorcycles were subjected to a rough and sometimes uncomfortable ride, since the seat, was also likely to be directly attached to the motorcycle frame. While such a configuration could be acceptable for short distances, the popularity of long motorcycle road trips made the lack of a rear suspension system unacceptable to at least some motorcycle riders and owners.

To address the issue, the now well known swing arm technology was developed. A swing arm serves as the mounting device for the rear wheel assembly of the motorcycle. In addition, a swing arm is configured to be pivotably attached to the motorcycle frame. To further smooth the ride associated with the swing arm based suspension system, a shock absorbing device can also be installed between the swing arm and the motorcycle frame. In certain embodiments, the shock absorbing device is installed such that it is fairly well hidden from view which, at least to some motorcycle enthusiasts is aesthetically pleasing.

There are other aesthetic drawbacks to the swing arm system. One such aesthetic drawback is that incorporation of a swing arm generally results in a rear fender mounting in which the rear tire is separated from the rear fender by a larger than desired distance. The separation allows the rear tire to move with respect to the motorcycle frame (and frame mounted fender) while ensuring that the tire does not contact the fender. In addition, many motorcycles are manufactured where frame struts for the rear fender provide at least a portion of the support for a rear seat of the motorcycle. Since the frame struts associated with the fender provide at least some of the support for the seat, such fenders are rather large in size. These fenders may also serve as the mounting for backrests, saddlebags, luggage carriers, and a connection point for tow behind trailers.

However, many motorcycle enthusiasts believe that motorcycles are better looking when a smaller rear fender is mounted very close to the rear tire. The current popularity of custom manufactured motorcycles has only increased awareness of these rear fender size and mounting issues. In many custom motorcycles, the focus is mainly on aesthetics. Accordingly, some custom motorcycles do not incorporate swing arms in order to attain these aesthetic design goals. In addition, these motorcycles may incorporate a single seat design with a rear fender much smaller than those which are associated with a swing arm based design. Further, a distance between the tire and fender may be greatly reduced. However, many motorcycle enthusiasts are not able to obtain such a custom manufactured motorcycle.

BRIEF DESCRIPTION OF THE INVENTION

In one aspect, a swing arm configured to be attached to a frame of a motorcycle is provided. The swing arm comprises at least one attachment member, a pair of V-shaped swing arm members each comprising an open end, a pair of swing arm side plates each attached across the open end of a respective V-shaped swing arm member, and at least two cross members configured to attach the side plates to one another. Each swing arm side plate comprises a swing arm pivot for pivotably attaching the swing arm to the motorcycle frame and a plurality of openings. The openings are configured to align with holes formed in the motorcycle frame and accept insertion of the at least one attachment member. Insertion of attachment members is configured to not allow pivoting of the swing arm with respect to the motorcycle frame.

In another aspect, a method for modifying a suspension system of a motorcycle to convert the motorcycle from having a swing arm pivotably attached to a motorcycle frame to a motorcycle having the swing arm rigidly attached to the motorcycle frame is provided. The method comprises forming a plurality of holes in the motorcycle frame, providing a plurality of openings in the swing arm, the openings in the swing arm are configured to align with respective holes in the motorcycle frame as the swing arm pivots with respect to the motorcycle frame, and inserting attachment devices in the aligned holes and openings.

In still another aspect, a suspension conversion kit for a motorcycle is provided which comprises at least one attachment device and a swing arm configured to be pivotably attached to a frame of the motorcycle. The swing arm further comprises a plurality of openings therethrough and the openings and at least one attachment device are configured for rigidly attaching the swing arm to the frame of the motorcycle.

In yet another aspect, a suspension system for customizing a motorcycle is provided. The suspension system comprises a motorcycle frame comprising a plurality of holes formed therein, a swing arm comprising a plurality of swing arm pivots located along a swing arm pivot axis, and a pivoting attachment member configured to pivotably attach the swing arm to the motorcycle frame utilizing the swing arm pivots. The swing arm further comprises a plurality of openings formed in the swing arm that are configured for alignment with the holes in the motorcycle frame. The suspension system comprises at least one attachment device configured to engage the holes in the motorcycle frame and the openings in the swing arm to rigidly attach the swing arm to the motorcycle frame. The attachment devices are removable to allow a pivoting action between the motorcycle frame and the swing arm.

In another aspect, a method for modifying a suspension system and appearance of a motorcycle which includes a swing arm pivotably attached to a frame of the motorcycle is provided. The method comprises removing fender frame struts from the motorcycle frame, forming a plurality of holes in the motorcycle frame, and providing a plurality of openings in the swing arm, the openings in the swing arm configured to align with respective holes in the motorcycle frame as the swing arm pivots with respect to the motorcycle frame. The method further comprises providing a fender configured to be attached to the motorcycle utilizing at least a portion of the aligned openings and holes, and inserting attachment devices through the aligned holes and openings to fixedly attach the fender and swing arm to the motorcycle frame.

DETAILED DESCRIPTION OF THE INVENTION

Figure 1:
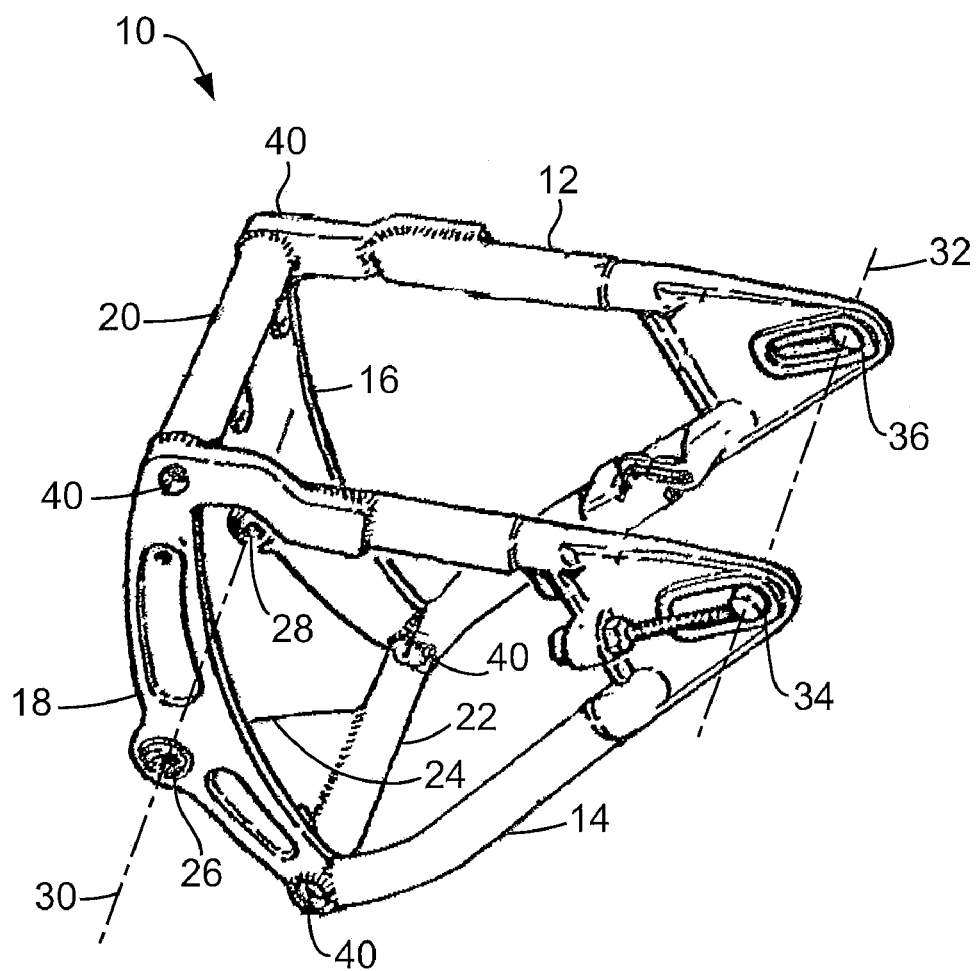
FIG. 1 is perspective view of a motorcycle swing arm.

FIG. 1 is perspective view of a motorcycle swing arm 10 including a first V-shaped swing arm member 12 and a second V-shaped swing arm member 14. A first swing arm side plate 16 is attached across an opening of the "V" of first V-shaped swing arm member 12 and a second swing arm side plate 18 is attached across an opening of the "V" of second V-shaped swing arm member 14. Cross members 20 and 22 are utilized to attach the combination of swing arm member 12 and first swing arm side plate 16 to the combination of swing arm member 14 and second swing arm side plate 18. In various embodiments, cross members 20 and 22 may or may not include a bore therethrough. In one embodiment, cross members 20 and 22 include separate bores at each end which extend through only a portion of cross members 20 and 22. In another embodiment, cross members 20 and 22 are welded onto swing arm side plates 16 and 18, and bores are drilled through both the respective side plate and cross member. A connecting plate 24 is attached to cross member 22 and is utilized when attaching a shock absorbing device (not shown) between swing arm 10 and a motorcycle frame (not shown).

Generally, swing arm 10 pivotally connects to the motorcycle frame utilizing swing arm pivots 26 and 28 which are located along a swing arm pivot axis 30. Opposite swing arm pivot axis 30 is a rear axle axis 32 which passes through rear axle attachment lugs 34 and 36. In operation, when a wheel and tire assembly (not shown) is mounted to swing arm 10 utilizing rear axle attachment lugs 34 and 36, a radius of the tire is less than the distance between rear axle attachment lugs 34 and 36 and cross members 20 and 22. Therefore, the tire is able to rotate when its hub (not shown) is attached to swing arm 10.

Swing arm 10 further includes openings 40 which extend through swing arm side plates 16 and 18 and into cross members 20 and 22. In one embodiment, one or more of openings 40 are drilled and tapped for insertion of an attachment device, for example, a bolt, as further described below. In other embodiments, openings similar to openings 40 may be included which are not aligned with cross members 20 and 22. In still another embodiment, cross members 20 and 22 are formed from a tubular material and one of openings 40 and diameter of cross members 20 and 22 are too large for threading and insertion of the attachment device. In such an embodiment, a piece of material (not shown), for example, a small steel plate, is welded to swing arm 10 over openings 40, and then drilled and tapped for insertion of, for example, a bolt.

Embodiments of cross members 20 and 22, for example those which are fully bored or partially bored, may also include threads tapped therein. As further described below, insertion of such attachment devices (shown in FIG. 4) allows a user to remove the pivoting action of swing arm 10, while not having to remove either swing arm 10, members that allow pivoting of swing arm 10 with respect to a motorcycle frame, or any shock absorbing device mounted between swing arm 10 and the motorcycle frame.

Figure 2:
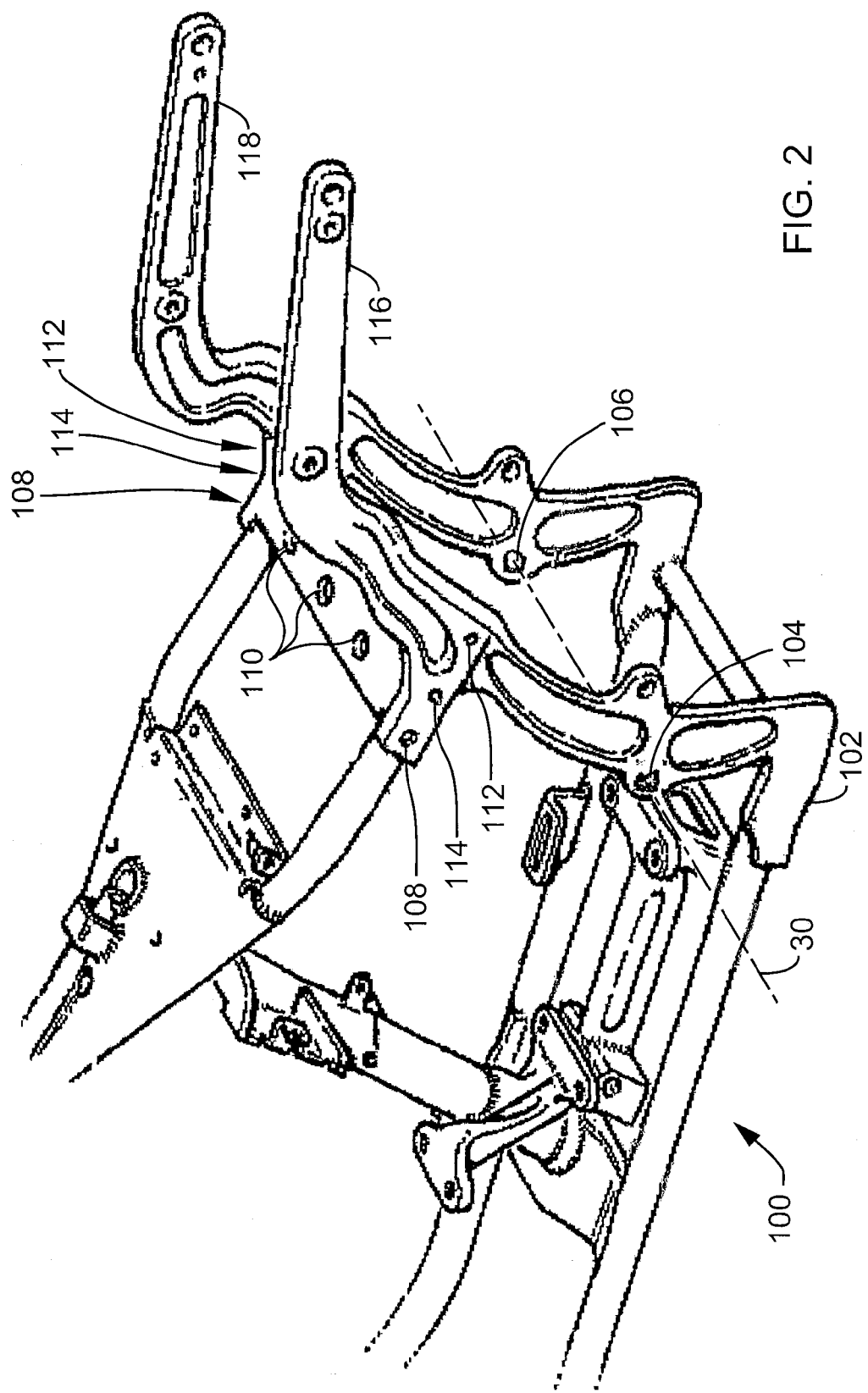
FIG. 2 is a perspective view of a rear portion of a motorcycle frame.

FIG. 2 is a perspective view of a rear portion of a typical motorcycle frame 100 which includes a swing arm attachment unit 102 attached thereto. Swing arm attachment unit 102 is configured to pivotably attach swing arm 10 (shown in FIG. 1) to motorcycle frame 100. For simplicity, only swing arm attachment unit 102 and its operation will be described. Swing arm pivot axis 30 is also shown in FIG. 2 to at least partially illustrate pivoting attachment of swing arm attachment unit 102 to swing arm 10 through pivoting attachment openings 104 and 106. Swing arm attachment unit 102 further includes openings 108 and 110, one or more of which may be utilized to attach a seat (not shown in FIG. 2) to motorcycle frame 100. Swing arm attachment unit 102 also includes openings 112 and 114 which are utilized, along with fender frame struts 116 and 118 extending from swing arm attachment unit 102, to attach a rear fender (not shown in FIG. 2) to motorcycle frame 100.

Openings 112 may be utilized in attachment of seats and/or fenders depending on a specific configuration. In at least some known motorcycles, fender frame struts 116 and 118 provide support for the mounting of fenders to motorcycle frame 100. In these motorcycles, decorative fender struts may be utilized in conjunction with (typically fitting over) the fender frame strut for the mounting of a fender.

Figure 3:
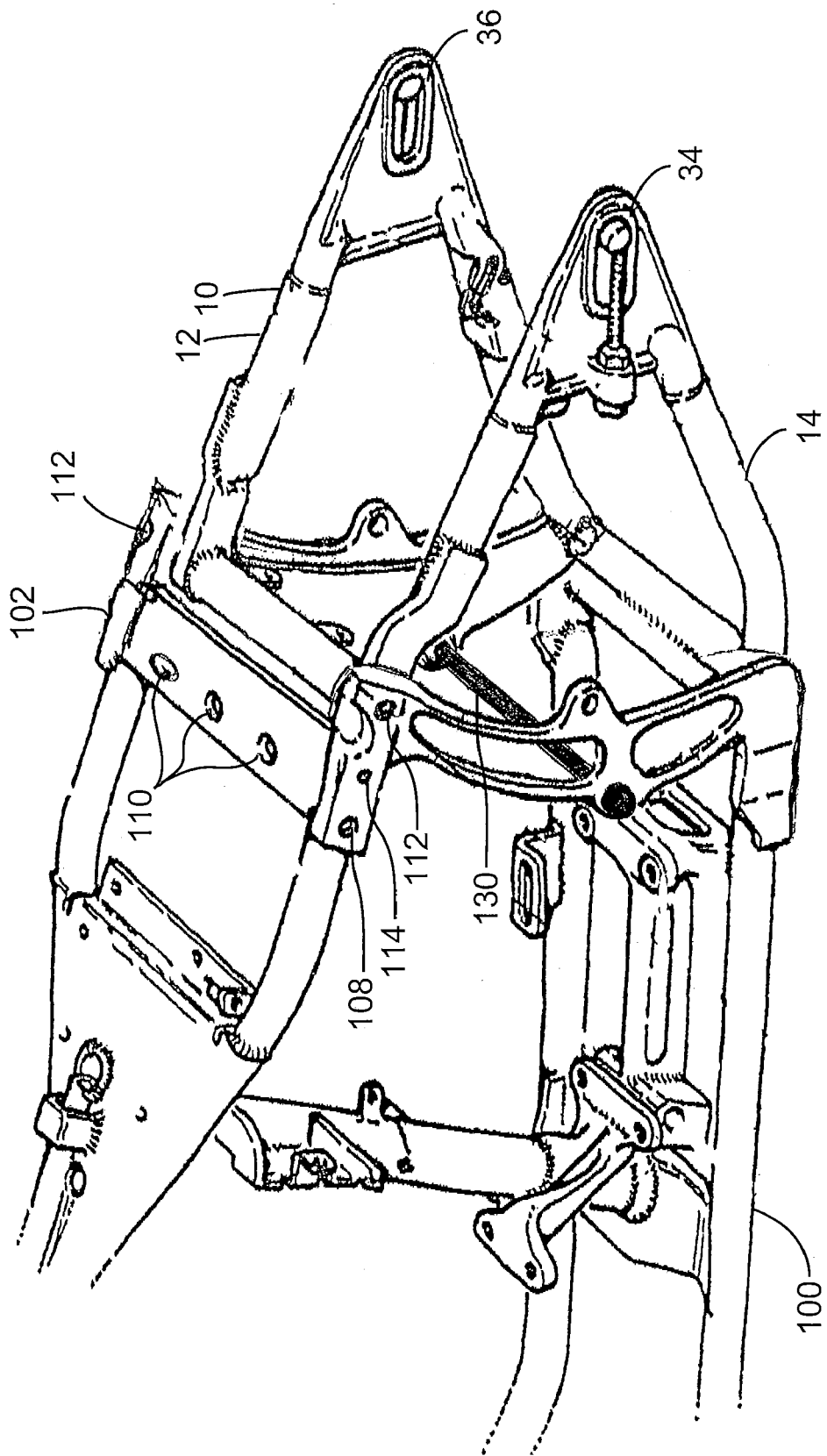
FIG. 3 is a perspective view of the swing arm shown in FIG. 1 pivotably attached to the rear portion of the motorcycle frame shown in FIG. 2.

FIG. 3 is a perspective view of swing arm 10 pivotably attached to swing arm attachment unit 102 of motorcycle frame 100. For clarity, fender frame struts 116 and 118 are not shown. To take advantage of the shock absorbing capabilities afforded by the use of swing arm 10, swing arm 10 is pivotably attached to swing arm attachment unit 102 utilizing a pivoting attachment member 130. Pivoting attachment member 130 represents any number of attachment devices which allow a pivoting attachment between two separate pieces. In a specific embodiment, pivoting attachment member 130 is a bolt, with threads (not shown) on one end which engages a nut after the bolt has been inserted through swing arm 10 and swing arm attachment unit 102. In such an embodiment, swing arm 10 may incorporate bushings or bearings that have been seated within swing arm pivots 26 and 28 (shown in FIG. 1).

Figure 4:
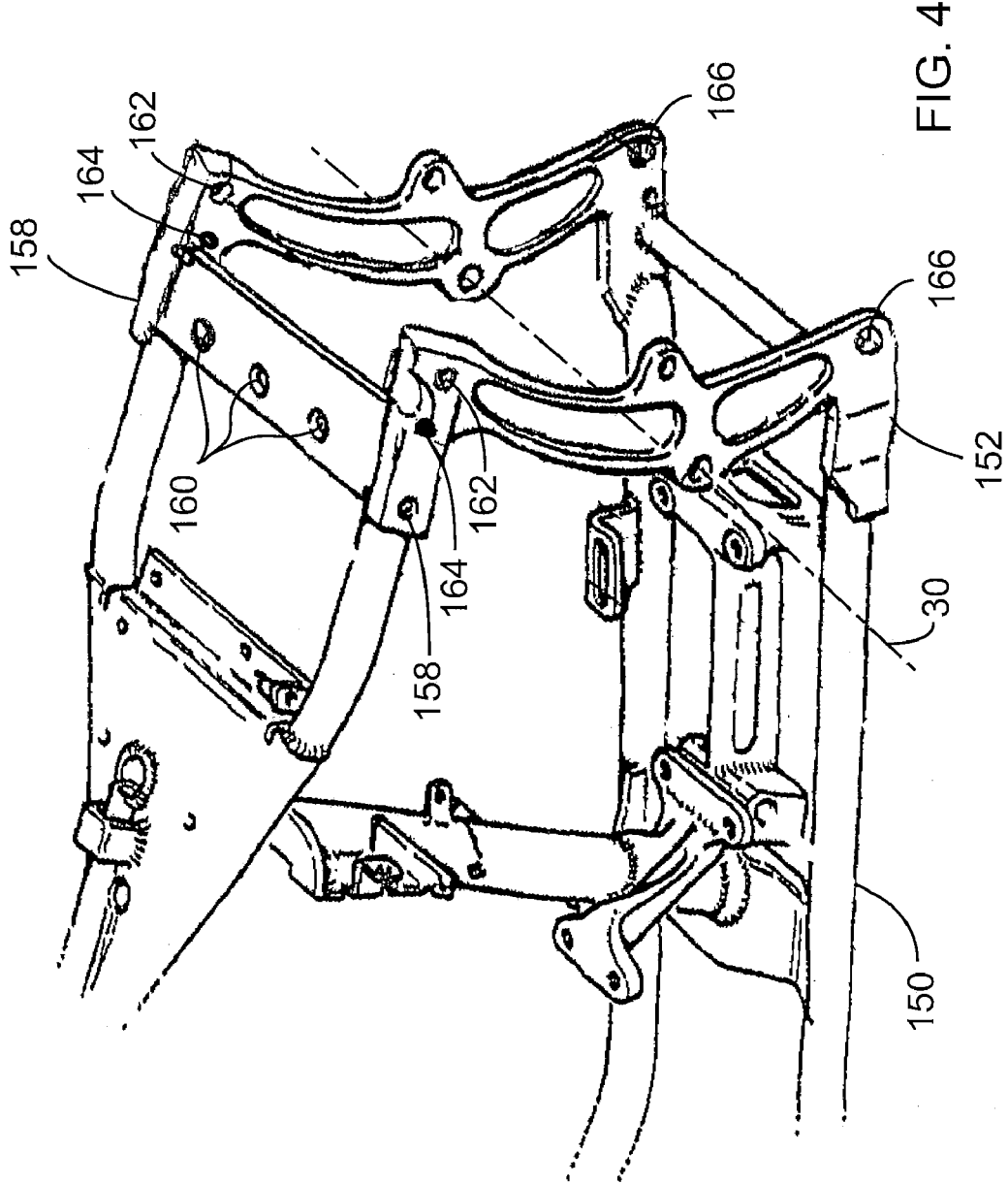
FIG. 4 is a perspective view of a rear portion of a motorcycle frame configured for attachment of a non-pivoting swing arm.

FIG. 4 is a perspective view of a rear portion of a motorcycle frame 150 which includes a swing arm attachment unit 152 where the fender frame struts have been removed for reasons described below. Swing arm attachment unit 152 is configured to attach to swing arm 10 (shown in FIG. 1). Swing arm pivot axis 30 is also shown in FIG. 4 to at least partially illustrate pivoting attachment of swing arm attachment unit 152 to swing arm 10 as described above. Swing arm attachment unit 152 further includes openings 158 and 160, one or more of which may be utilized to attach a seat (not shown in FIG. 4) to motorcycle frame 150. Swing arm attachment unit 152 also includes openings 162 and 164 which are utilized to attach a rear fender (not shown in FIG. 4) to motorcycle frame 150. Swing arm attachment unit 152 further includes still another set of openings 166 that have been formed near the bottom of swing arm attachment unit 152. As further described below, openings 162 and 166 are utilized to remove the pivoting action of swing arm 10 with respect to swing arm attachment unit 152. In a specific embodiment, openings 162 and 166 are also threaded to accept an attachment device. Openings 162 may also be utilized in attachment of seats and/or fenders depending on a specific configuration.

Figure 5:
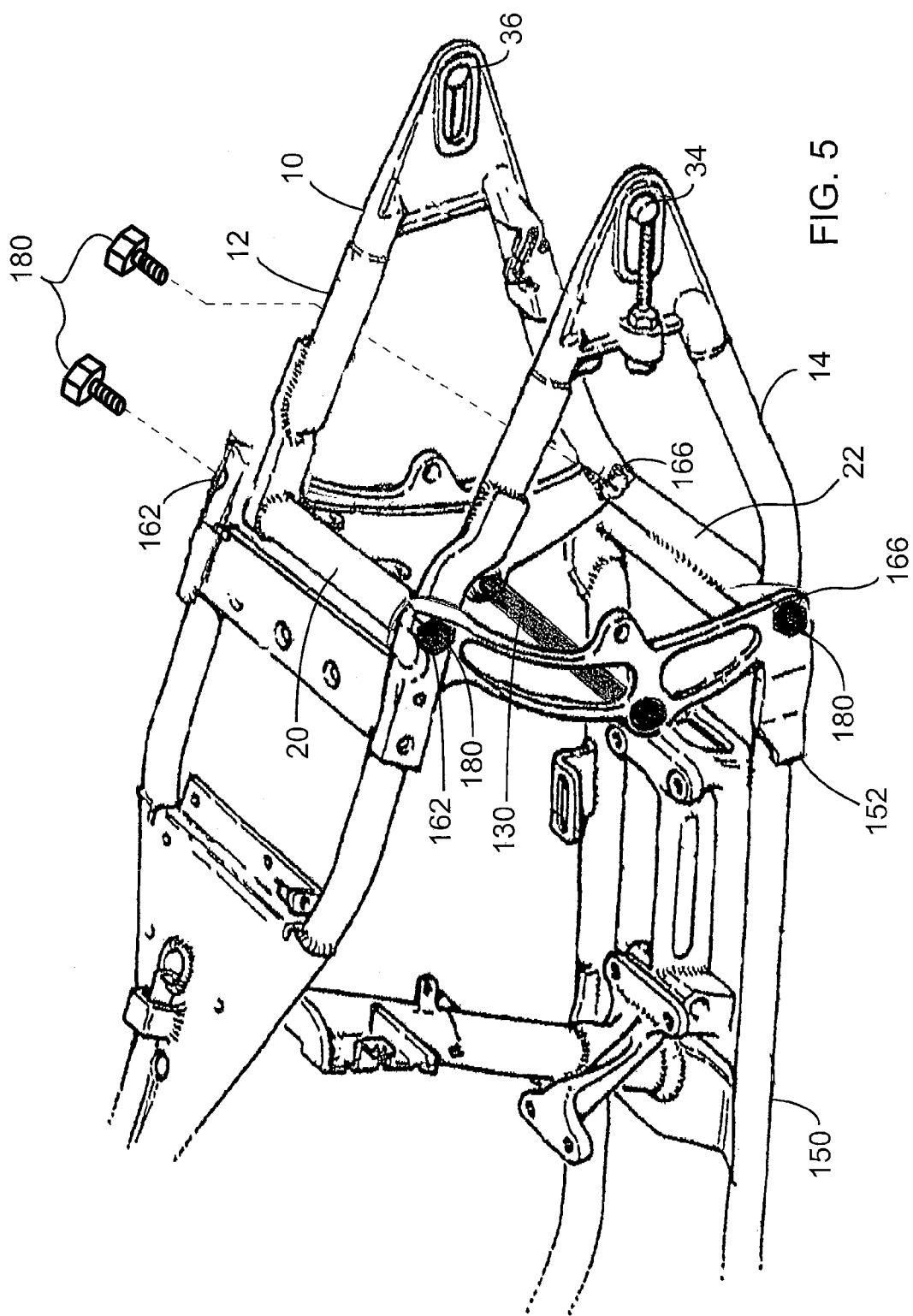
FIG. 5 is a perspective view of the swing arm shown in FIG. 1 non-pivotably attached to the rear portion of the motorcycle frame shown in FIG. 4.

FIG. 5 is a perspective view of swing arm 10 non-pivotably attached to swing arm attachment unit 152 of motorcycle frame 150. In addition to utilizing pivoting attachment member 130 to attach swing arm 10 to swing arm attachment unit 152, a plurality of attachment devices 180 are inserted through openings 162 and 166 of swing arm attachment unit 152 and into swing arm 10 at openings 40. Insertion of attachment devices 180 effectively removes any pivoting action of swing arm 10 with respect to swing arm attachment unit 152. In one specific embodiment, openings 162 and 166 in swing arm attachment unit 152 and openings 40 in swing arm 10 are both threaded to ensure that vibrations from driving the motorcycle do not affect the integrity of attachment devices 180. Attachment devices which do not utilize threads are also contemplated. Removal of any shock absorbing devices between motorcycle frame 150 and swing arm 10 is not necessary to insert (or remove) attachment devices 180, which provides the user with an easy conversion between a pivoting swing arm and a rigidly mounted swing arm.

By removing the pivoting action between swing arm 10 and motorcycle frame 150, and removing fender frame struts (described above), a user is able to incorporate other changes to their motorcycle in order to change the aesthetic appearance of the motorcycle to be closer in appearance to a custom manufactured motorcycle.

Figure 6:
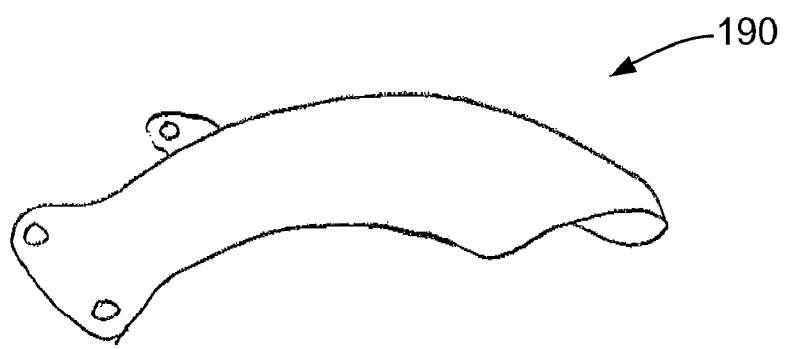
FIG. 6 illustrates a motorcycle rear fender utilized when the swing arm of FIG. 1 is non-pivotably attached to the rear portion of the motorcycle frame of FIG. 4.

FIG. 6 is a view of a motorcycle rear fender 190 utilized when swing arm 10 (shown in FIG. 1) is non-pivotably attached to swing arm attachment unit 102 (shown in FIG. 2). As shown, fender 190 is substantially smaller than fender 200 and does not include fender struts that are similar to fender struts 202. Rather, fender 190 is configured to bolt directly to swing arm attachment unit 152 through openings 162 and 164 using attachment devices 180 (shown in FIGS. 4 and 5). Since swing arm 10 does not pivot, fender 190 is configured to be much closer to a tire of the motorcycle. As such, fender 190 does not support the back rest, saddlebags, and the like and therefore fender struts are not needed. However, fender 190 and a one person seat for the motorcycle provides the aesthetic appearance that is desired by at least some motorcycle enthusiasts.

Figure 7:
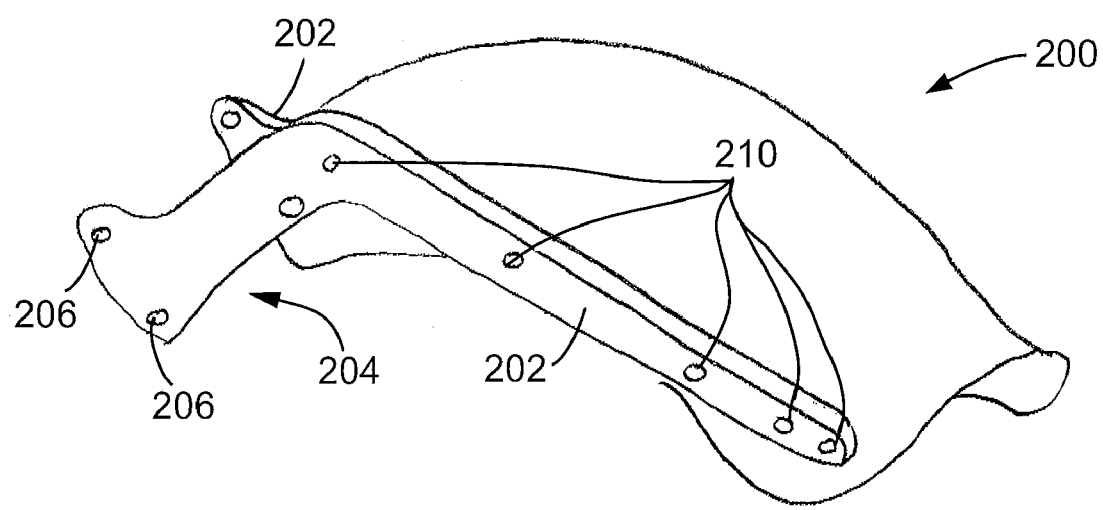
FIG. 7 illustrates a motorcycle rear fender and frame struts utilized when the swing arm shown in FIG. 1 is pivotably attached to the rear portion of the motorcycle frame shown in FIG. 4.

FIG. 7 is a view of a motorcycle rear fender 200 which may be utilized when swing arm 10 (shown in FIG. 1) is pivotably attached to swing arm attachment unit 152. Fender 200 includes fender struts 202 that include a mounting portion 204 having bores 206 therethrough which are utilized to mount fender 200 to motorcycle frame 150 and/or swing arm attachment unit 152. Fender struts 202 extend towards the rear of fender 200 and includes other mounting holes 210 which are utilized for the mounting of two person seats, a separate back seat, back rests, saddlebags, tow behind trailers, and the like. As swing arm 10 is configured to pivot, fender 200 has to be mounted with a separation from the rear tire of the motorcycle, to allow for the travel of swing arm 10 (and the rear wheel assembly mounted thereto). As fender frame struts 116 and 118 (shown in FIG. 2) have been removed from the motorcycle frame, fender struts 202 are configured to provide the required support for, for example, a two person seat and back rest. In one embodiment, fender struts are fabricated from one-half inch steel to provide such support.

As described above, a kit which includes swing arm 10, attachment devices 180, and fender 190 allows a user to easily modify their motorcycle from a motorcycle with a pivoting swing arm (and associated fender and seat) to a motorcycle with the swing arm rigidly mounted to the frame of the motorcycle. The modifications herein described are easily attained with the fairly simple insertion (or removal) of a number of attachment devices 150, and without the removal of the rear wheel and/or swing arm. Conversion to a rigidly mounted swing arm affords the user the opportunity to change the aesthetic appearance of their motorcycle to that of a custom manufactured motorcycle. While, conversion from the rigidly mounted swing arm to the pivoting swing arm provides the user with the smoother ride afforded by the combination of the pivoting swing arm and shock absorbing system. Optionally, when converting back to a pivoting swing arm, the above described kit may also include removable fender struts, for example, fender struts 202 which attach to the frame of the motorcycle and allow for attachment of a stock-like fender, for example, fender 200.

With such a conversion system, a user is able to enjoy long trips on their motorcycle as the suspension system is activated through the pivoting swing arm. In addition, the motorcycle can be ridden by more than one rider as the motorcycle may further include fender 200 and a two person seat configured to attach to fender struts 202. Upon arrival to a destination, for example, a gathering of motorcycle enthusiasts, the user is able to convert their motorcycle to the above described rigidly mounted swing arm system, for example, including the tire hugging fender (e.g. fender 190) and a smaller one person seat, to afford themselves of the custom manufactured motorcycle look that such enthusiasts appreciate.

While the invention has been described in terms of various specific embodiments, those skilled in the art will recognize that the invention can be practiced with modification within the spirit and scope of the claims.

What is claimed is:

1. A suspension system for customizing a motorcycle, said suspension system comprising:
   a motorcycle frame comprising a first side and a second side each comprising a plurality of holes formed therein;
   a swing arm comprising a plurality of swing arm pivots located along a swing arm pivot axis, said swing arm further comprising a plurality of openings formed therein, said swing arm pivots and said openings aligning with respective said holes in said first side and said second side of said motorcycle frame;
   a pivoting attachment member pivotably attaching said swing arm to said motorcycle frame utilizing said swing arm pivots and a first portion of the holes formed in said motorcycle frame; and
   a plurality of attachment devices, at least one said attachment device configured to engage one of said holes in said first side of said motorcycle frame and a respective one of said openings in said swing arm and at least one said attachment device configured to engage one of said holes in said second side of said motorcycle frame and a respective one of said openings in said swing arm to fixedly attach said swing arm to said motor cycle frame, said attachment devices removable to allow utilization of said motorcycle frame and said swing arm in a motorcycle configuration having a pivoting action between said motorcycle frame and said swing arm enabling operation of any shock absorbing device therebetween, said at least one attachment device insertable to allow utilization of said motorcycle frame and said swing arm in a motorcycle configuration that suppresses the pivoting action between said motorcycle frame and said swing arm, thereby suppressing operation of any shock absorbing device therebetween.

2. A suspension system according to claim 1 wherein said motorcycle frame comprises a swing arm attachment unit, said holes formed in said swing arm attachment unit, said swing arm configured to pivotably attach to said swing arm attachment unit.

3. A suspension system according to claim 1 wherein said swing arm comprises at least one cross member extending between each respective pair of said openings, said at least one cross member comprising at least a partial bore therein, at least one said attachment device configured to engage said partial bore.

4. A suspension system according to claim 1 wherein said holes in said motorcycle frame and said openings in said swing arm comprise threads formed therein, said attachment devices comprising threads configured to engage said threads in said holes and said openings.

5. A suspension system according to claim 1 wherein said swing arm comprises at least one cross member extending between each respective pair of said openings, said at least one cross member comprising a bore extending therethrough, wherein at least one of said attachment devices is configured to extend through one of said holes in said first side of said motorcycle frame, through said openings and said cross member, and through a second said hole in said second side of said motorcycle frame, to rigidly attach said swing arm to said motorcycle frame.

* * * * *